United States Patent [19]

King, Jr. et al.

[11] Patent Number: 5,386,444
[45] Date of Patent: Jan. 31, 1995

[54] FUEL ROD LOADING APPARATUS

[75] Inventors: Harold B. King, Jr.; Eric B. Johansson, both of Wrightsville Beach; John L. Harmon, Wilmington, all of N.C.

[73] Assignee: General Electric Company, San Jose, Calif.

[21] Appl. No.: 4,012

[22] Filed: Jan. 15, 1993

[51] Int. Cl.⁶ .................. G21C 21/00; G21C 19/00
[52] U.S. Cl. ..................................................... 376/261
[58] Field of Search ..................... 376/260, 261, 446; 29/238, 723, 906

[56] References Cited

U.S. PATENT DOCUMENTS 4,729,867  3/1988  De Mario ........................... 376/261

*Primary Examiner*—Daniel D. Wasil
*Attorney, Agent, or Firm*—J. E. McGinness

[57] ABSTRACT

An apparatus for loading nuclear fuel rods through spacer grid cells of a fuel bundle includes a handle having at least one elongate clip joined thereto, and a flexible tubular sleeve joined to the clip. The clip rigidly supports the sleeve along its longitudinal axis while allowing the sleeve to unfurl perpendicularly thereto for disassembly from a fuel rod. In several embodiments of the invention, the clip may include a slot for bridging adjacent grid cells during assembly, or the clip may be removably fixedly joined to the handle for allowing easy replacement of the sleeves.

10 Claims, 6 Drawing Sheets

FUEL ROD LOADING APPARATUS

The present invention relates generally to nuclear reactor fuel bundles, and, more specifically, to an apparatus for loading fuel rods therein without scratching the fuel rods.

BACKGROUND OF THE INVENTION

In a nuclear reactor, such as boiling water reactor (BWR) for example, nuclear fuel bundles are arranged in a reactor core for heating water to generate steam. Each of the fuel bundles includes a plurality of longitudinally extending fuel rods arranged in a suitable array such as a square array of nine-by-nine fuel rods. Of course, the number of fuel rods in any given fuel bundle design may be conventionally selected, and some of the fuel rod positions may instead include conventional water rods of the same or larger diameter as the fuel rods as desired.

Each of the fuel rods includes a plurality of tubular nuclear pellets contained in an elongate tubular cladding which is typically made of Zircaloy. The outer surface of the cladding has a preferred smooth finish characterized by the absence of scratches since scratches in the cladding can accelerate corrosion of the cladding which is undesirable. The cladding may be scratched during assembly of the fuel bundle when the individual fuel rods are axially inserted through their respective spacer grids having cells which contain bosses and/or springs provided to securely clamp the individual fuel rods at various intermediate locations to prevent movement and vibration thereof during operation in the nuclear reactor.

More specifically, a typical fuel bundle includes an upper tieplate and a lower tieplate at opposite longitudinal ends of the fuel bundle, and a plurality of longitudinally spaced apart spacer grids disposed therebetween. Each of the spacer grids includes a plurality of cells configured for receiving and supporting respective ones of the fuel rods. The cells may take any conventional configuration including square, circular, or other shapes for surrounding the fuel rod. Each of the cells typically includes a plurality of bosses or stand-offs which center the fuel rod within the cell. The cells typically also include a suitable spring such as a leaf spring which clamps the fuel rod against the bosses to prevent movement such as vibratory movement during operation of the fuel bundle in the reactor core.

In order to assemble the individual fuel rods into the fuel bundles, each fuel rod is typically inserted horizontally through each of the spacer grids in turn, and, therefore, slides along the bosses and the springs of the respective cells. Such sliding can scratch the fuel rod cladding which can lead to undesirable corrosion during operation.

In order to prevent such scratching of the fuel rods during the assembly process, various conventional techniques are utilized. For example, the fuel rod may have a suitable coating over its cladding to act as a lubricant and to prevent scratching of the cladding itself during the assembly process. It is also known to use metal or polyester protective sleeves in the respective cells so that sliding of the fuel rods through the cells does not cause scratching thereof. Conventional protective sleeves are typically utilized individually and typically extend longitudinally through the spacer grids which typically number about seven or eight, for example, or the sleeves may be arranged in groups extending from a common handle. Furthermore, suitable additional devices are sometimes required to compress the cell springs for allowing the fuel rods to be inserted through the cells.

These various conventional configurations have disadvantages including the need to assemble fuel rods near the center of the spacer grids prior to assembly of the outer rows of fuel rods to allow access to the protective sleeves for the removal thereof after assembly of the fuel rods. Since the protective sleeves must necessarily be relatively thin and flexible for allowing the fuel rods to be inserted in the cells without binding or damage thereto, and for allowing the sleeves to be unfurled from the fuel rods after assembly, the sleeves are, therefore, easily worn and damaged as well as being potentially distorted during assembly which increases the difficulty of inserting the fuel rods during the assembly procedure.

SUMMARY OF THE INVENTION

An apparatus for loading nuclear fuel rods through spacer grid cells of a fuel bundle includes a handle having at least one elongate clip joined thereto, and a flexible tubular sleeve joined to the clip. The clip rigidly supports the sleeve along its longitudinal axis while allowing the sleeve to unfurl perpendicularly thereto for disassembly from a fuel rod. In several embodiments of the invention, the clip may include a slot for bridging adjacent grid cells during assembly, or the clip may be removably fixedly joined to the handle for allowing easy replacement of the sleeves.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
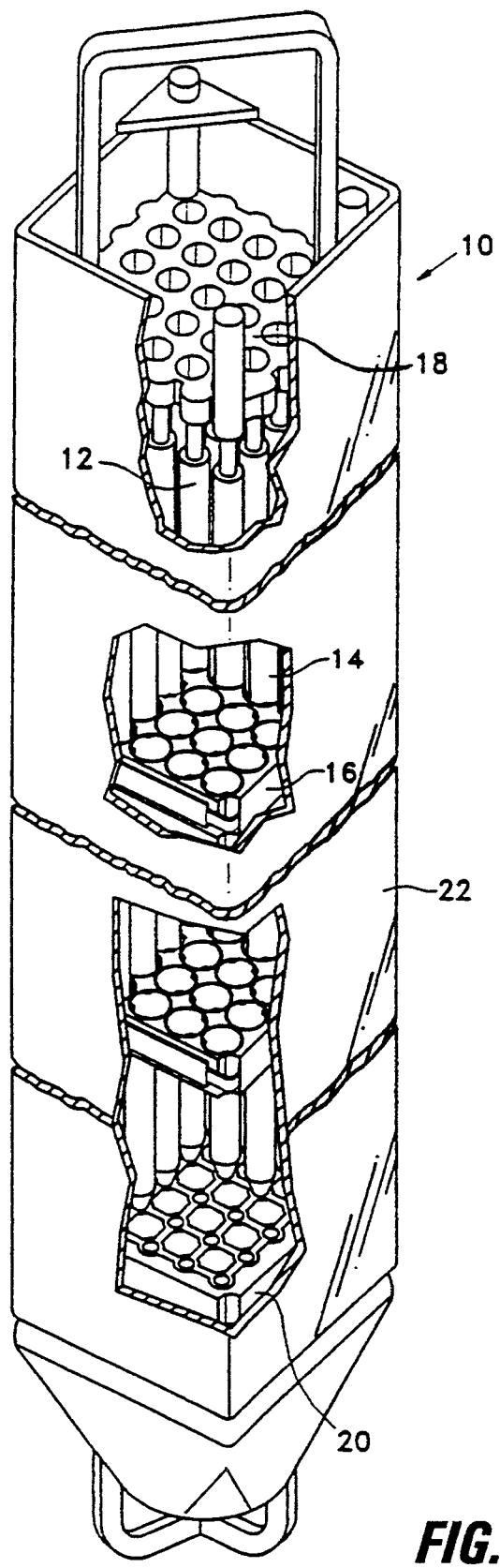
FIG. 1 is a perspective, partly cutaway view of an exemplary nuclear fuel bundle having a plurality of transversely spaced apart fuel rods extending through longitudinally spaced apart spacer grids.

Illustrated schematically in FIG. 1 is an exemplary nuclear fuel bundle 10 for a boiling water reactor (BWR) for example, which includes a plurality of conventional, elongate nuclear fuel rods 12 which are transversely spaced apart to define flowpaths 14 therebetween for channeling water which is heated during conventional operation. The fuel rods 12 are conventional and include nuclear pellets within a tubular outer cladding made from Zircaloy for example, and are transversely spaced apart from each other by a plurality of longitudinally spaced apart spacer grids 16. Any suitable number of spacer grids 16 may be used, for example about eight grids 16, for supporting the fuel rods 12 along their intermediate length to reduce vibratory movement thereof during operation. The top ends of the fuel rods 12 are conventionally supported in an upper tieplate 18, and the lower ends thereof are conventionally supported in a lower tieplate 20. Surrounding the fuel rods 12 is a conventional tubular flow channel 22 which extends upwardly from the lower tieplate 20 and provides a boundary for the passage of water upwardly through the lower tieplate 20 and in turn through the respective spacer grids 16 and between the fuel rods 12, which water is heated by the fuel rods 12 during normal operation in the nuclear reactor core.

Figure 2:
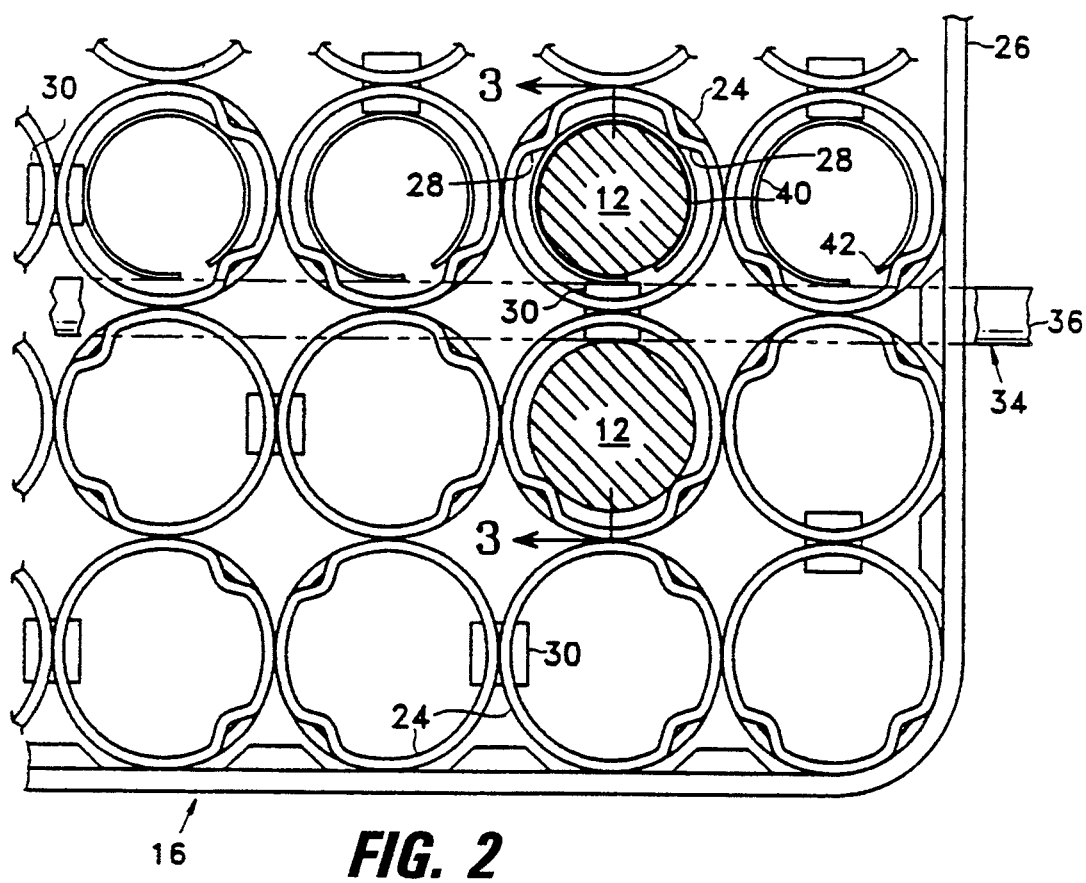
FIG. 2 is an enlarged view of a portion of one of the spacer grids illustrated in FIG. 1 illustrating exemplary cells thereof for laterally supporting respective fuel rods, with an exemplary fuel rod loading apparatus being shown in accordance with one embodiment of the present invention.

The spacer grid 16 illustrated in FIG. 1 may take any conventional configuration for positioning the fuel rods 12 in a suitable array such as the square array illustrated in FIG. 1. FIG. 2 is an enlarged view of a corner portion of one of the spacer grids 16 which includes a plurality of individual tubular cells 24 which abut each other in a square array and are bounded around the circumference of the spacer grid 16 by a conventional band 26. Although circular cells 24 are illustrated in this exemplary embodiment, the cells 24 may take any other conventional form as desired.

Figure 3:
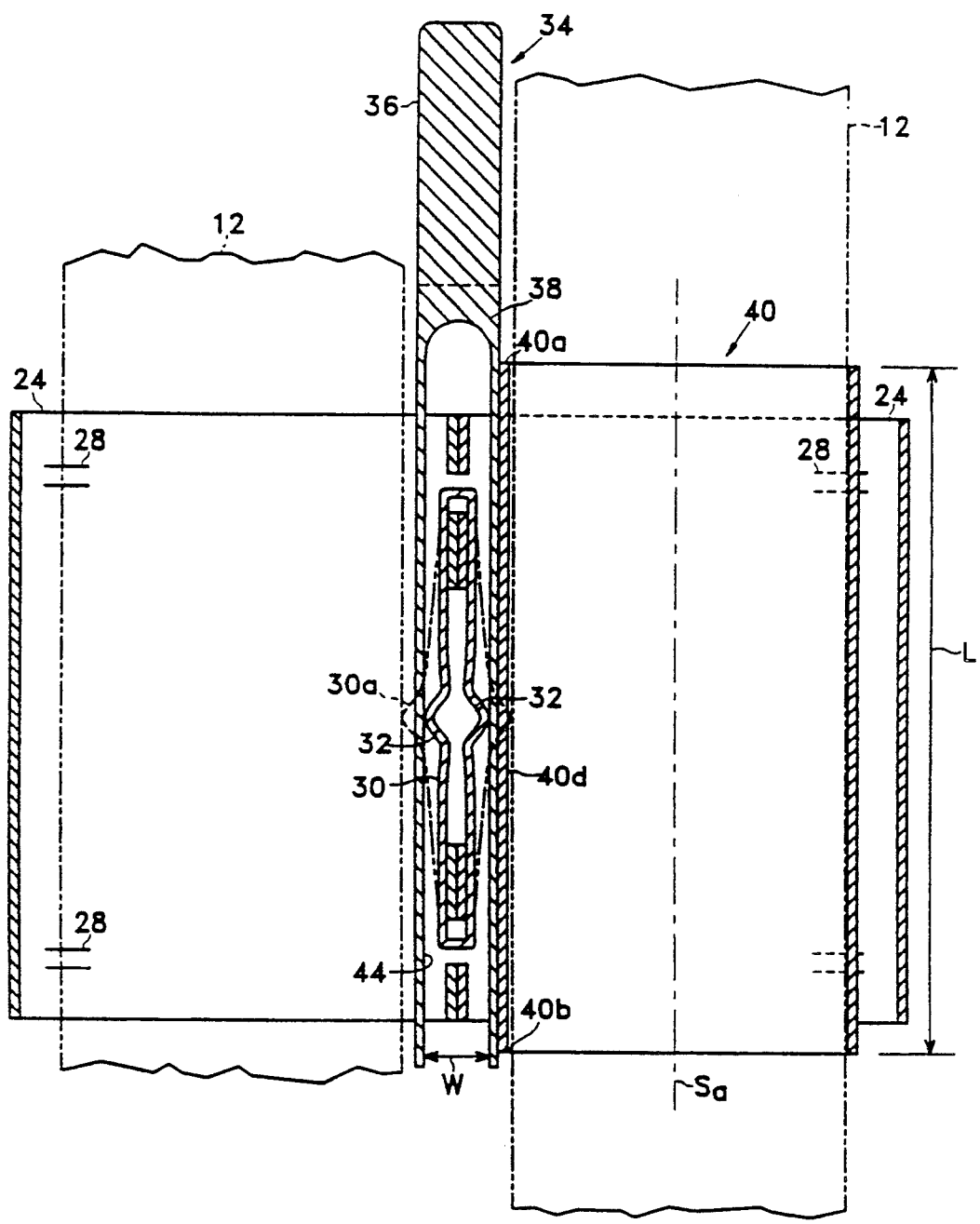
FIG. 3 is a longitudinal sectional view of two adjacent grid cells and the loading apparatus illustrated in FIG. 2 and taken along line 3—3.

Referring to both FIGS. 2 and 3, each of the cells 24 is a tubular member having a plurality of conventional bosses or stand-offs 28 projecting radially inwardly. In the exemplary embodiment illustrated, the bosses 28 are simply formed by circumferentially slitting portions of the cell 24 and plastically deforming such portions radially inwardly in a conventional manner. In this exemplary embodiment, two bosses 28 are located at the top of the cell 24 at about 90° from each other, and two additional bosses 28 are aligned therewith at the bottom of the cell 24. Disposed oppositely to the bosses 28 is a conventional leaf spring 30 which extends parallel to the cells 24 in the vertical direction, and includes oppositely facing contact portions 32 at the center thereof which elastically provide a suitable clamping force against the fuel rods 12 positioned within the cells 24 in a conventional manner. In FIG. 3, the leaf spring 30 is shown in phantom line designated 30a in its normal position providing a clamping force against the fuel rods 12 also shown in phantom.

Since the bosses 28 and the leaf spring contact portions 32 extend radially inwardly inside each of the cells 24, they provide contact points against the fuel rod 12 which may scratch the outer surface of the fuel rod 12 as it is axially inserted through each of the cells 24. Such scratching leads to undesirable corrosion during operation of the fuel rods 12 in the nuclear reactor core, which scratching may be eliminated by using a loading apparatus 34 shown by itself in FIG. 4 in accordance with an exemplary embodiment of the present invention, and shown installed in the spacer grid 16 in FIGS. 2 and 3, for example. The loading apparatus 34 includes an elongate holder or handle 36 in the form of a bar, for example, having at least one, and in the preferred embodiment, a plurality of parallel, elongate clips 38 fixedly joined to the handle 36 and extending perpendicularly therewith. Colinearly fixedly joined to each of the clips 38 is a flexible, thin tubular sleeve 40 which is positionable inside an individual cell 24 to protect the fuel rod 12 from scratches from the bosses 28 and the leaf spring contact portions 32. The sleeve 40 as shown in FIG. 3, for example, includes a proximal or top end 40a, and an opposite distal, or bottom end 40b spaced along a longitudinal axis $S_a$ of the sleeve 40. The sleeve 40 includes a longitudinal split 42 as shown in FIGS. 2 and 4 extending completely between the proximal and distal ends 40a, 40b for allowing the sleeve 40 to unfurl as described in further detail below.

Figure 4:
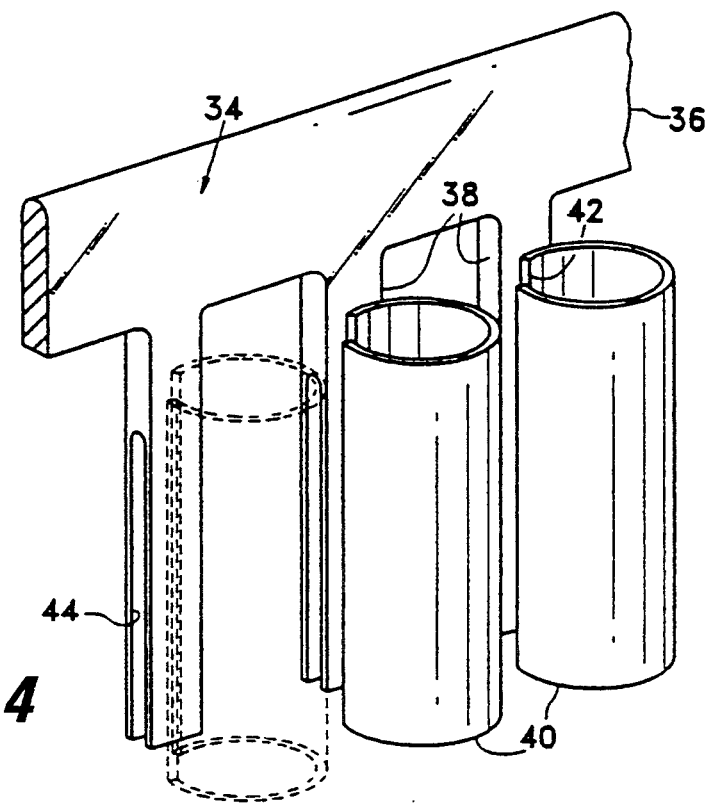
FIG. 4 is a perspective view of a portion of the loading apparatus illustrated in FIG. 2.

As shown in FIGS. 3 and 4, for example, the clip 38 is configured or sized to rigidly support the sleeve 40 along the sleeve axis $S_a$ for inserting one of the fuel rods 12 through the sleeve 40 and a respective cell 24 during assembly, while allowing the sleeve 40 to unfurl perpendicularly to the sleeve axis $S_a$ for removing the sleeve 40 from the so-installed fuel rod 12. As shown in FIG. 3, the sleeve 40 may be positioned downwardly into a respective one of the cells 24 and is preferably sized, i.e. has a length L, to position the sleeve distal end 40b within a respective one of the cells 24 to fully cover all of the bosses 28 and the leaf spring contact portions 32 for allowing the fuel rod 12 to then be translated through the sleeve 40 within the cell 24, with the sleeve 40 thereby preventing scratching of the fuel rod 12 by the bosses 28 and the leaf spring contact portions 32 of the cell 24.

Figure 5:
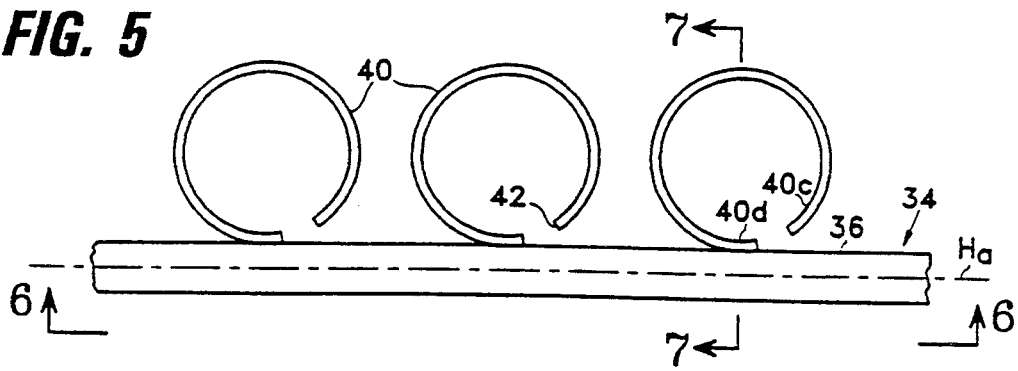
FIG. 5 is a top view of the loading apparatus illustrated in FIGS. 2-4.
Figure 6:
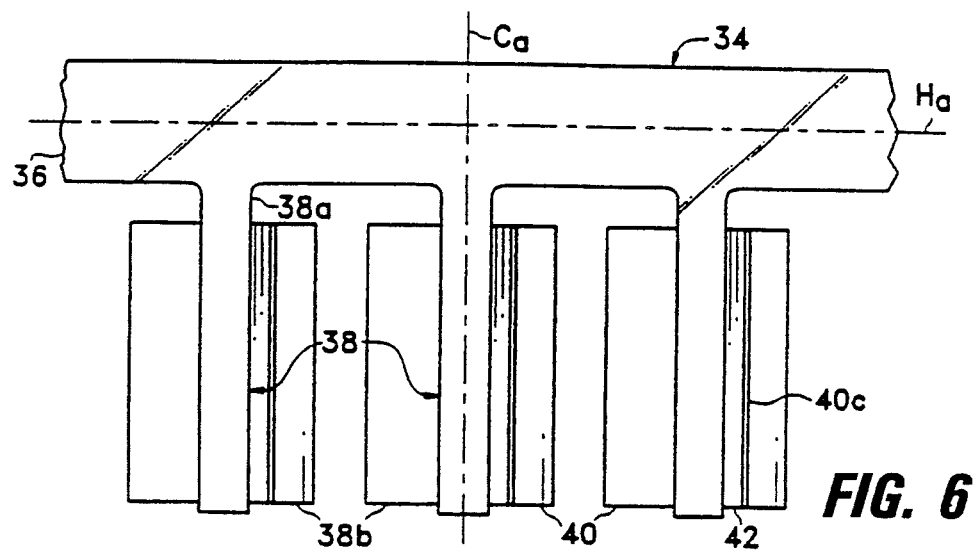
FIG. 6 is an elevational side view of the loading apparatus illustrated in FIG. 5 and taken along line 6—6.
Figure 7:
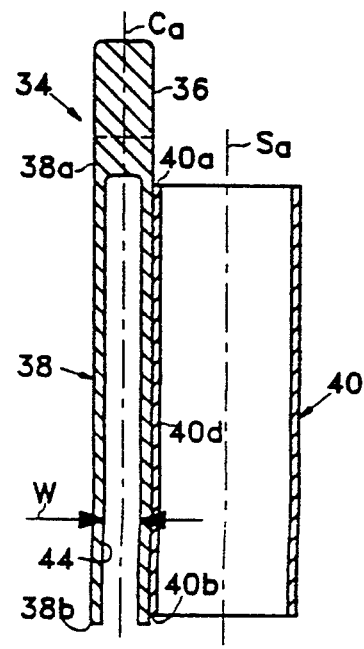
FIG. 7 is an elevational, transverse sectional view of the loading apparatus illustrated in FIG. 5 and taken along line 7—7.
Figure 9:
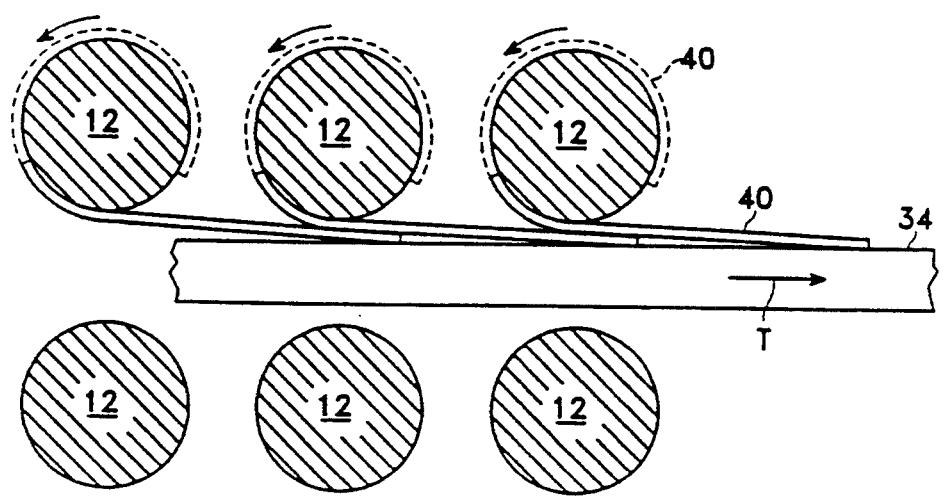
FIG. 9 in an end view of one of the loading apparatuses illustrated in FIG. 8 illustrating the removal thereof after insertion of the fuel rods into the spacer grids.

The loading apparatus 34 is illustrated in more particularity in FIGS. 5-7. The sleeves 40 are relatively thin and flexible and may be formed of conventional metal or plastic having a thickness of about 0.1 mm for example. Since the sleeve is relatively flexible it is easily subject to distortion and damage, and is readily worn during repeated usage thereof. Accordingly, by attaching the sleeve 40 to a respective one of the clips 38, the clip 38 provides structural reinforcement of the sleeve 40 along its longitudinal axis $S_a$ while still allowing the sleeve 40 to remain flexible in a transverse plane to allow unfurling or unrolling of the sleeve 40 for disassembling the sleeve 40 from the installed fuel rod 12. As shown in FIGS. 5 and 6, each of the sleeves 40 preferably includes a longitudinally extending free edge 40c along the split 42, and an opposing longitudinally extending support edge 40d (see also FIG. 7), which defines the split 42 along with the free edge 40c, and is fixedly joined to the clip 38 so that transverse translation of the handle 36 and the clips 38 joined thereto is effective to unfurl the sleeves 40 from around the fuel rods 12 assembled therethrough, as best shown in FIG. 9. Since the sleeve 40 is fixedly joined to the clip 38 along its entire support edge 40d, transverse pulling of the handle 36 to remove the sleeves 40 from the fuel rods 12 uniformly unfurls the sleeves 40 along their entire length L which prevents distortion or damage thereto during disassembly.

Although a single sleeve 40 may be joined to the handle 36, in the preferred embodiment of the present invention, a plurality of the sleeves 40 are fixedly joined to a respective plurality of the clips 38, which in turn, are integrally joined to the handle 36 as shown for example in FIGS. 5 and 6. Accordingly, the handle 36 is preferably elongate and has a longitudinal axis $H_a$, and the plurality of clips 38 extend perpendicularly to the handle axis $H_a$ and are spaced longitudinally apart. Each of the clips 38 includes its own longitudinal axis $C_a$ which is disposed perpendicularly to the handle axis $H_a$ as shown in FIG. 6 for example. And, each of the sleeves 40 is fixedly joined colinearly with a respective one of the clips 38, with the respective sleeve and clip axes $S_a$ and $C_a$ being parallel with each other.

As shown in FIG. 6, each of the clips 38 is preferably in the form of a finger extending perpendicularly away from the handle 34 and includes a proximal end 38a preferably integrally joined to the handle 36, and an opposite distal end 38b spaced longitudinally from the clip proximal end 38a. As shown in FIG. 7, each of the clips 38 preferably includes a generally U-shaped slot 44 extending upwardly from the clip distal end 38b toward the clip proximal end 38a. The clip slot 44 is preferably sized with a suitable width W for allowing each of the sleeves 40 to be concurrently positioned into respective ones of the cells 24 with each of the clip slots 44 bridging adjacent ones of the cells 24 which holds the sleeves 40 in position inside the cells 24.

More specifically, and referring to FIG. 3, the individual sleeves 40 are initially aligned above respective ones of the cells 24, with the respective clips 38 being aligned along the junction of adjacent cells 24. The handle 36 may then be used for translating the sleeves 40 axially inwardly into their respective cells 24 while at the same time the respective clip slots 44 are lowered downwardly over the adjacent cells 24. In this way, the sleeves 40 may be fully inserted into the respective cells 24, with the clip slots 44 receiving therein respective ones of abutting cells 24. In the preferred embodiment as illustrated in FIG. 3, the sleeve length L is sized for extending solely through a single one of the spacer grids 16 and, accordingly, the clip slot 44 need only extend for the corresponding height of the one spacer grid 16 and the cells 24 thereof.

Since the leaf springs 32 illustrated in FIG. 3 are not necessarily disposed in a common line of adjacent cells 24, as is evident from FIG. 2, the respective clip slot 44 may have suitable widths W selected for providing a relatively close fit with the abutting cells 24 without accommodating the leaf springs 30 if desired. However, and as shown in FIG. 3, the clips 38 may be used for also initially compressing together the individual leaf springs 30 to improve the assembly of the fuel rods 12 through the respective cells 24. Accordingly, each of the clip slots 44 bridging adjacent, abutting cells 24 is preferably sized in width W for elastically compressing the leaf spring 30 to the solid position illustrated in FIG. 3 as the clip 38 is translated into the adjacent cells 24. In the embodiment illustrated in FIG. 3, the clip 38 is similar to a single-piece clothespin which slightly compresses the leaf spring 30 as it is translated downwardly thereover. The respective fuel rod 12 may then be inserted through the sleeve 40 into the cell 24, and once all of the fuel rods 12 are inserted through the respective sleeves 40 of the loading apparatus 34, the handle 36 may then be translated upwardly away from the cells 24 to axially remove the sleeves 40 by sliding them upwardly along the fuel rods 12 until the sleeves 40 are fully withdrawn from the cells 24. As shown in FIG. 3, the leaf spring 30 will slightly expand to its phantom position 30a in contact with the assembled fuel rod 12 to exert a clamping force thereagainst to hold the fuel rod 12 against the respective bosses 28.

In this exemplary embodiment of the leaf spring 30, the clip 38 compresses the leaf spring 30 on both sides which increases the stresses therein, For some designs, so compressing the leaf spring 30 from both sides may lead to undesirable distortion thereof and, therefore, the width W of the clip slot 44 may be suitably enlarged to minimize the compression of the leaf spring 32. However, room for the concurrent installation of the fuel rods 12 in the adjacent cells 24 on both sides of the spring 30 may no longer be available and, therefore, it may be desirable to load only one at a time of the adjacent cells 24. In this situation, the respective clips 38 and sleeves 40 may be positioned on the handle 36 for inserting the fuel rods 12 into every other cell 24 having a common leaf spring 30 therebetween. In this way, the fuel rods 12 may be separately loaded into the adjacent cells 24 in turn with each other by first using the loading apparatus 34 in one set of cells 24, removing the loading apparatus 34 therefrom and then using again the loading apparatus 34 in the remaining adjacent cells 24.

Figure 8:
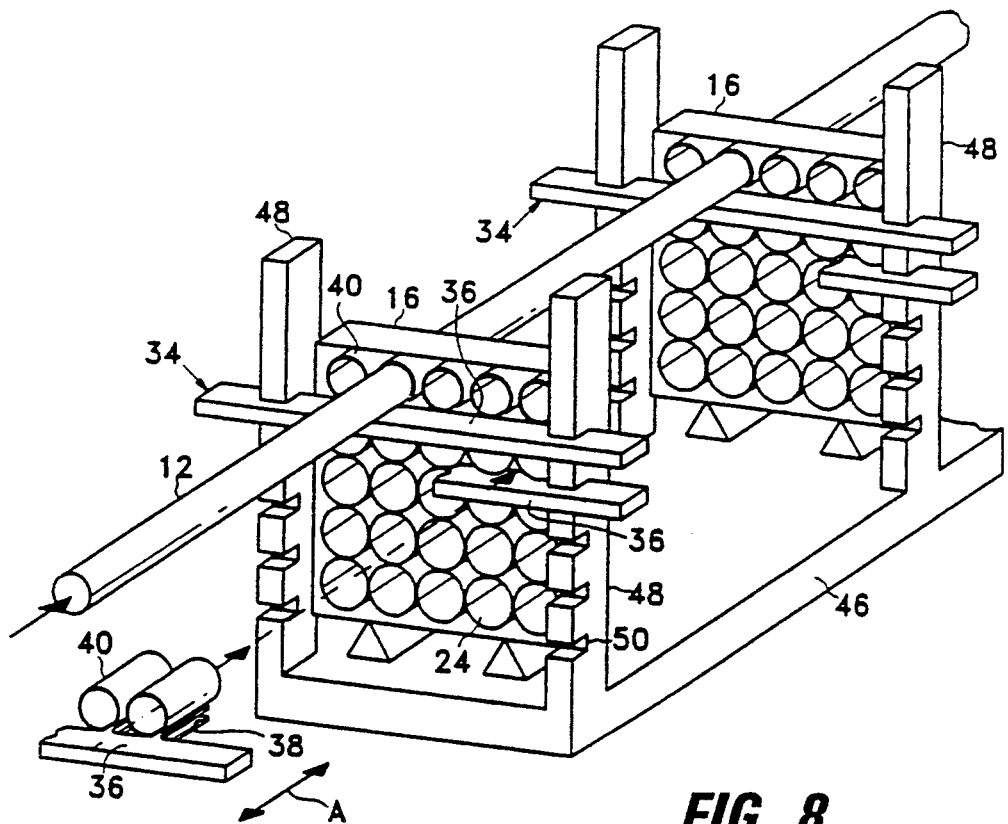
FIG. 8 is a schematic, perspective view of an exemplary assembly table containing a pair of spacer grids and several exemplary fuel rod loading apparatuses for assembling the fuel rods through the spacer grids in accordance with one embodiment of the present invention.

FIG. 8 illustrates schematically a configuration wherein several of the loading apparatuses 34 in various embodiments may be used for horizontally inserting the fuel rods 12 into position in the respective spacer grids 16. A suitable table 46 is provided from which extends upwardly respective pairs of vertical stands 48 each having a plurality of longitudinally spaced apart mounting recesses 50 for supporting the handles 36 of the respective loading apparatuses 34. The several spacer grids 16 are suitably supported vertically on the table 46 and spaced longitudinally apart, with up to about eight of the spacer grids 16 being mounted on the table 46. A respective loading apparatus 34 may be provided for each of the rows of the grid cells 24 with each having a respective handle 36 containing two or more sleeves 40 joined to their respective clips 38. The handles 36 may be supported at one or both ends thereof in the stands 48 as desired and preferably extend horizontally between the stands 48 bridging respective ones of the spacer grids 16.

In the preferred embodiment of the invention as illustrated in FIGS. 4 and 7, for example, the handle 36 and the clips 38 joined thereto are preferably coplanar so that when the handle 36 is mounted horizontally in the stands 48, the handle 36 itself provides a horizontal support for the fuel rod 12 being translated thereover. As shown in FIG. 8, each of the loading apparatuses 34 is individually initially assembled to the respective spacer grids 16 by being axially translated therein along the direction arrow A. The sleeves 40 are, therefore, inserted horizontally into their respective cells 24, with the respective clips 38 bridging adjacent ones of the cells 24 (see FIG. 3), and then the handle 36 is supported in its respective mounting recesses 50. One or more or all of the loading apparatuses 34 may be so installed for filling the various cells 24 with respective sleeves 40 in any sequence desired or in full. The individual fuel rods 12 may then be conventionally translated horizontally along the handles 36 and through their respective sleeves 40 through the several spacer grids 16 until the fuel rods 12 are fully inserted therein. As many fuel rods 12 as desired may be so installed, or all of the fuel rods 12 may be installed to completely fill the spacer grids 16.

In order to disassemble the loading apparatuses 34, the respective handles 36 are pulled outwardly away from the respective spacer grids 16 in the A-direction for axially removing the respective sleeves 40 from their cells 24, with the sleeves 40 still surrounding the fuel rods 12 until the sleeves 40 are fully withdrawn axially from the cells 24. The handles 36 may then be pulled laterally or transversely as indicated by the direction arrow T in FIG. 9 to pull the sleeves 40 laterally and unfurl the sleeves 40 from around the several fuel rods 12 without obstruction from adjacent fuel rods 12 for completely removing the loading apparatuses 34.

The entire loading apparatus 34 including the handle 36, clips 38, and sleeves 40 may be formed from conventional plastics, with the sleeves 40 being suitably fixedly joined to the clips 38 by being glued or ultrasonically welded thereto, for example. However, since the sleeves 40 are relatively thin and flexible they will also readily wear during usage, and, therefore, the ability to individually replace worn-out sleeves 40 or the ability to vary the spacing of the several sleeves 40 is desired.

Figure 10:
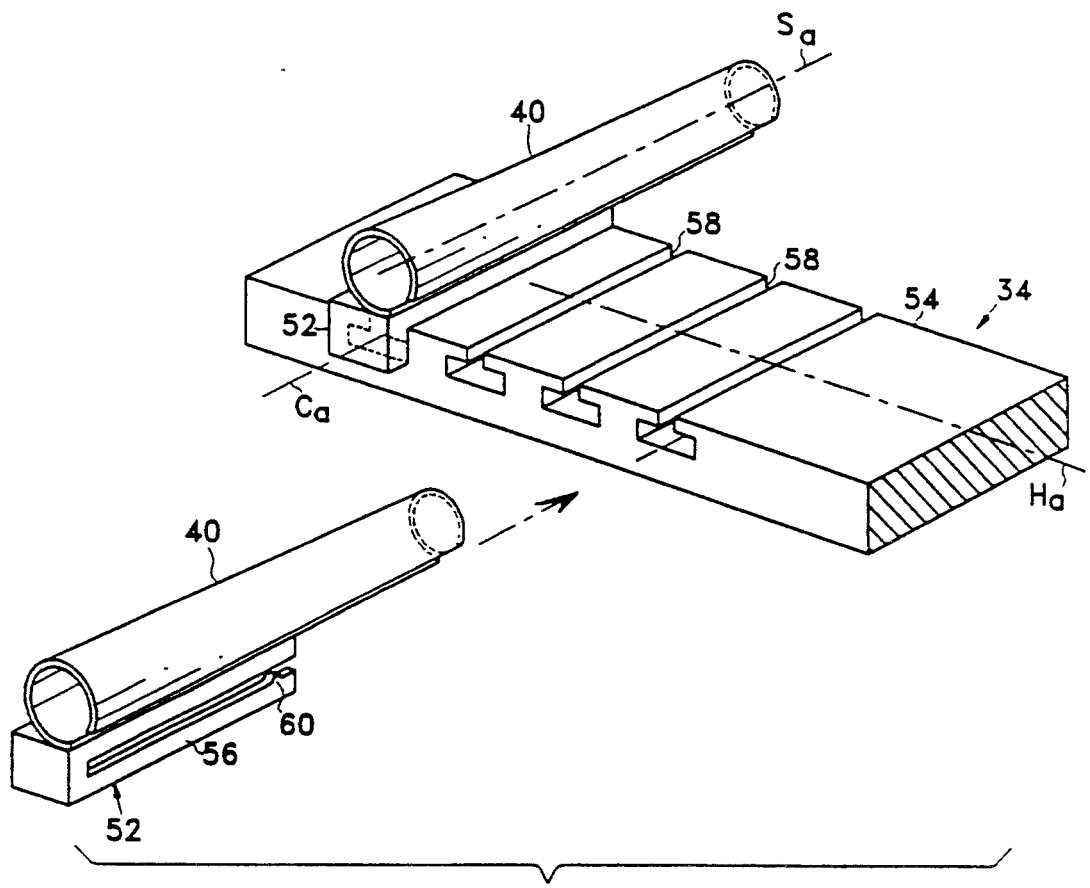
FIG. 10 is a perspective view of a fuel rod loading apparatus in accordance with a second embodiment of the present invention having a common handle with individually removable clips and sleeves.

Accordingly, FIG. 10 illustrates an alternate embodiment of the loading apparatus 34 having removable sleeves 40. In this embodiment, each of the sleeves 40 is fixedly joined to a respective clip 52, which clips 52 are removably fixedly joined to a handle 54 in a dovetail-and-groove configuration. For example, each of the clips 52 includes a longitudinally extending T-shaped dovetail 56, and the handle 54 includes a plurality of longitudinally spaced apart, complementary T-shaped dovetail grooves 58 sized for longitudinally receiving respective ones of the clip dovetails 56 for removably joining the clips 52, and therefore the attached sleeves 40, to the handle 54. In this way individual ones of the sleeves 40 may be removed from the handle 54 for replacement as required, or, alternatively, any of the dovetail grooves 58 may remain empty to selectively space the sleeves 40 as desired for particular configurations of the spacer grids 16.

The clip dovetails 56 as shown in FIG. 10 may also include conventional bosses or detents 60 which may take any conventional form for temporarily locking the individual clips 52 in their respective dovetail grooves 58.

Figure 11:
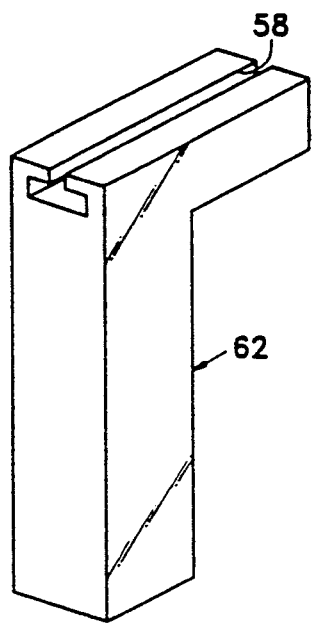
FIG. 11 is a perspective view of an exemplary handle individually supporting one of the clips and sleeves illustrated in FIG. 10 in accordance with a third embodiment of the present invention.

Illustrated in FIG. 11 is another embodiment of the present invention including a handle 62 having solely a single longitudinally extending dovetail groove 58 therein for receiving a single complementary dovetail clip 52 (see FIG. 10). In this way, individual sleeves 40 may be removed from an individual handle 62 as desired, but which embodiment does not enjoy the many additional advantages of the common handles 36 and 54 disclosed above, with each supporting a plurality of respective clips 38, 52 and sleeves 40.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An apparatus for loading nuclear fuel rods through a plurality of cells in a spacer grid of a fuel bundle comprising:
   a handle having at least one elongate clip fixedly joined thereto and extending perpendicularly therewith;
   a flexible tubular sleeve having a proximal end and an opposite distal end spaced along a longitudinal axis thereof, and a longitudinal split extending between said proximal and distal ends for allowing said sleeve to unfurl, said sleeve being colinearly fixedly joined to said clip, and said clip being configured to rigidly support said sleeve along said sleeve axis while allowing said sleeve to unfurl perpendicularly to said sleeve axis; and
   said sleeve being sized to position said sleeve distal end within one of said cells for allowing one of said fuel rods to be translated through said sleeve within said one cell, with said sleeve preventing scratching of said fuel rod by said one cell.

2. An apparatus according to claim 1 wherein:
   said handle is elongate and has a longitudinal axis;
   a plurality of said clips extend perpendicularly to said handle axis and are spaced longitudinally apart; and
   each of said clips includes a respective one of said sleeves fixedly joined colinearly therewith.

3. An apparatus according to claim 2 wherein each of said clips is in the form of a finger extending perpendicularly away from sand handle and includes:
   a proximal end integrally joined to said handle;
   a distal end spaced longitudinally from said clip proximal end; and a slot extending from said clip distal end toward said clip proximal end, said clip slot being sized for allowing each of said sleeves to be concurrently positioned into respective ones of said cells with each of said clip slots bridging adjacent ones of said cells.

4. An apparatus according to claim 3 wherein said handle and said clips are coplanar.

5. An apparatus according to claim 3 wherein said spacer grid includes an elongate leaf spring extending parallel to said cells and having contact portions extending transversely into said adjacent cells, and said clip slot is sized for compressing said leaf spring as said clip is translated into said adjacent cells and bridges said adjacent cells.

6. An apparatus according to claim 3 wherein each of said sleeves includes a longitudinally extending free edge along said split, and an opposing support edge along said split being fixedly joined to said clip so that transverse translation of said handle and said clips joined thereto is effective to unfurl said sleeves from around said fuel rods assembled therethrough.

7. An apparatus according to claim 3 wherein each of said sleeves has a length sized for extending solely through a single one of said spacer grids.

8. An apparatus according to claim 2 wherein each of said clips is removably fixedly joined to said handle in a dovetail-and-groove configuration.

9. An apparatus according to claim 8 wherein each of said clips includes a longitudinally extending dovetail, and said handle includes a plurality of spaced apart complementary dovetail grooves sized for longitudinally receiving respective ones of said clip dovetails for removably joining said clips to said handle.

10. An apparatus according to claim 1 wherein said handle includes solely a single longitudinally extending dovetail groove therein, and said clip includes a complementary dovetail sized for insertion into said dovetail groove for removably joining said clip to said handle.

* * * * *